United States Patent [19]
Lee

[11] Patent Number: 5,588,395
[45] Date of Patent: Dec. 31, 1996

[54] DRINKING TRAY FOR SMALL ANIMALS SHIPPED IN CONTAINERS

[76] Inventor: Eng-Hong Lee, 7 Tamarack Place, Guelph, Ontario, Canada, N1E 3Y5

[21] Appl. No.: 43,488

[22] Filed: Apr. 6, 1993

[51] Int. Cl.$^6$ ............................................. A01K 7/00
[52] U.S. Cl. ................................. 119/72; 119/61
[58] Field of Search ......................... 119/72, 18, 23, 119/52.1, 51.5, 58, 61, 74, 69.5; 206/552, 532, 533; 220/552, 532, 533; D7/554; D34/40, 46; D9/347

[56] References Cited

U.S. PATENT DOCUMENTS

| | | | |
|---|---|---|---|
| 948,434 | 2/1910 | Scott | 220/534 |
| 1,224,305 | 5/1917 | Kraus | 119/69.5 |
| 1,862,057 | 6/1932 | Lewis | 220/532 X |
| 2,469,034 | 5/1949 | Garris | 220/532 X |
| 2,677,350 | 5/1954 | Prestidge et al. | 119/61 |
| 4,593,816 | 6/1986 | Langenbeck | 220/532 X |

FOREIGN PATENT DOCUMENTS

| | | | |
|---|---|---|---|
| 790950 | 7/1968 | United Kingdom | 220/556 |

Primary Examiner—Thomas Price

[57] ABSTRACT

The present invention provides for a drinking tray for use by small animals. The drinking tray has at least two fluid containment regions mounted on a common base, the fluid containment regions being separated one from another by elongate openings extending across the tray. In an aspect of the invention there is provided a drinking tray for use in a shipping container for transport of small animals, the shipping container being divided into sections by removable dividers. The drinking tray has a plurality of fluid containment regions mounted on a common base for providing stability. The tray is provided with openings for accepting the inserts which divide the shipping cartons into sections, the openings separating the fluid containment regions one from another such that each section of the shipping carton will be provided with a fluid containment region. Each section of the tray is provided with a fluid holding portion having a capacity to hold sufficient fluid to prevent the dehydration of the animals in the section of the shipping tray during transport.

5 Claims, 2 Drawing Sheets

DRINKING TRAY FOR SMALL ANIMALS SHIPPED IN CONTAINERS

FIELD OF THE INVENTION

The present invention relates to drinking trays particularly for use in shipping containers for transport of small animals. In particular, the invention relates to a drinking tray for use in a shipping container for transport of small animals wherein the shipping container is divided into sections by removable dividers.

BACKGROUND OF THE INVENTION

Many small animals are shipped from place to place in shipping containers. During the transport of the small animal, it is advisable to provide water for their consumption in order to prevent dehydration of the animal. This is particularly true where the animals may be in transit for extended periods of time. One particular example of such a situation is the shipping of poultry hatchlings from the hatchery to the farmers who will be raising the hatchlings for market. In many situations, the hatchlings are shipped to the farms within the first few days of life and such very young poultry hatchlings are susceptible to dehydration if deprived of water for more than a day. In addition, poultry hatchlings do not enter feeding cycles until after they have ingested a certain amount of water. Thus, in the shipping of poultry hatchlings, it would be advantageous to provide for sufficient fluid to prevent dehydration of the hatchlings while not causing the hatchlings to commence the feeding cycle.

Attempts to provide drinking receptacles for shipping cartons have thus far not been totally acceptable as it is difficult to secure traditional drinking containers such as water bottles to the shipping cartons. The use of drinking trays has also been tried but once again it it difficult to secure the drinking tray to prevent its movement and possible tipping over during transportation.

SUMMARY OF THE INVENTION

The present invention provides for a drinking tray for use by small animals. The drinking tray comprises at least two fluid containment regions mounted on a common base each of the regions being provided with a drinking trough, the fluid containment regions being separated one from another by slots extending across the tray.

In an aspect of the present invention there is provided a drinking tray for use in a shipping container for transport of small animals, the shipping container being divided into sections by removable dividers. The drinking tray comprises a plurality of fluid containment regions mounted on a common base each of the regions being provided with a drinking trough for providing stability. The tray is provided with slots for accepting the inserts which divide the shipping cartons into sections, the slots separating the fluid containment regions one from another such that each section of the shipping carton will be provided with a fluid containment region. Each section of the tray is provided with a drinking trough having a capacity to hold sufficient fluid to prevent the dehydration of the animals in the section of the shipping tray during transport.

In another aspect of the invention, there is provided the combination of a shipping container for transport of small animals and a transport drinking tray. The shipping container is divided into at least two sections by removable dividers. The drinking tray comprises a plurality of fluid containment regions mounted on a common base each of the regions being provided with a drinking trough, the fluid containment regions being separated by slots extending across the base. The slots receive the removable dividers of the shipping container to stabilize all of the fluid containment regions through the common base and provide one fluid containment region for each section of the shipping container.

BRIEF DESCRIPTION OF THE DRAWINGS

The above as well as other advantages and features of the present invention will be described in greater detail according to a preferred embodiment of the present invention in which.

DETAILED DESCRIPTION OF THE PREFERRED EMBODIMENTS

Figure 1:
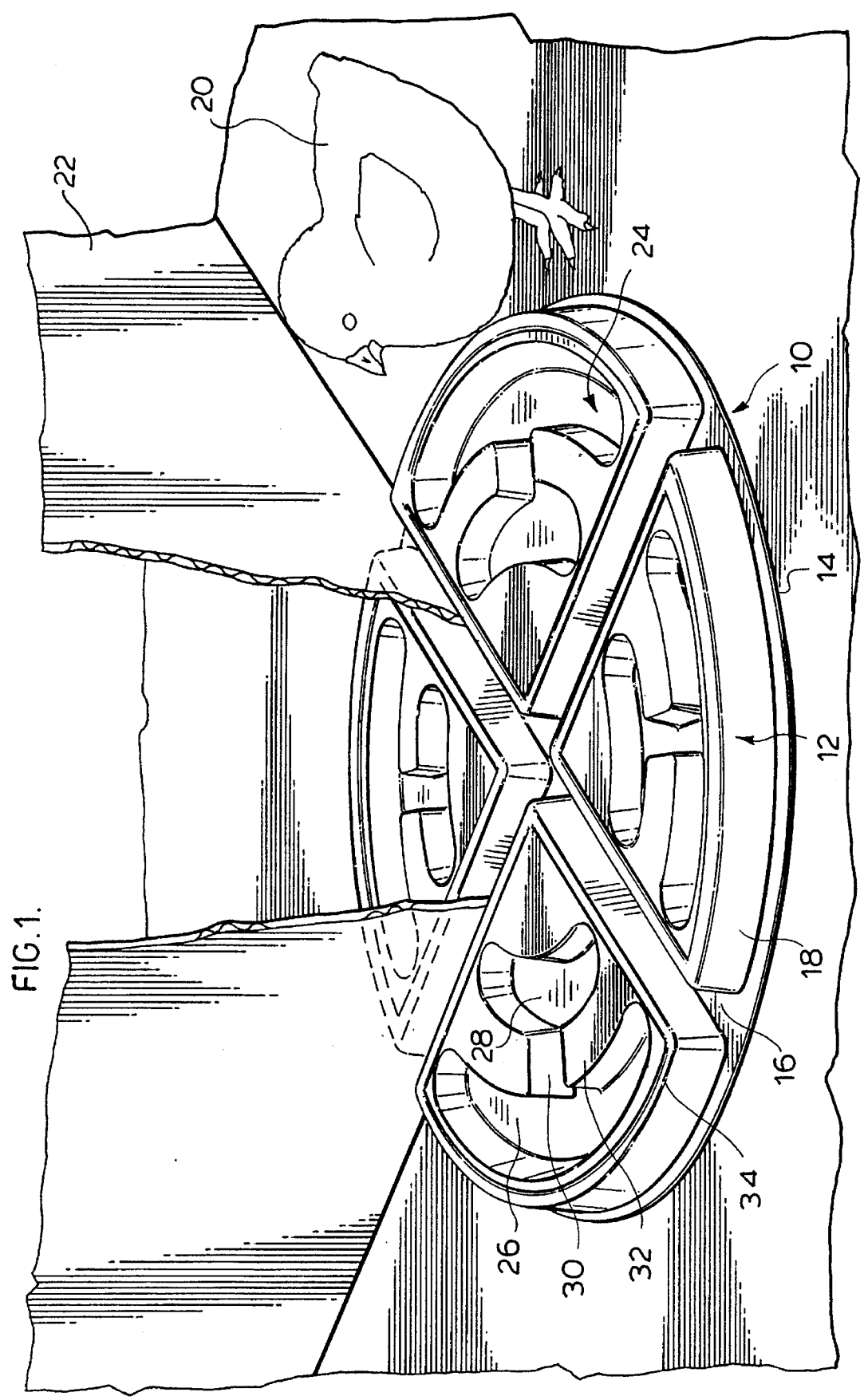
FIG. 1 is a perspective view of a preferred embodiment of the drinking tray of the present invention in use.

FIG. 1 illustrates a preferred embodiment of the drinking tray of the present invention shown generally by the numeral 10. The tray 10 has a plurality of fluid containment regions 12 mounted on a common base 14, the fluid containment regions 12 being separated one from another by openings 16 extending across the base 14.

The embodiment of the drinking tray 10 illustrated is for use in transporting of poultry hatchlings 20 from the hatchery to the raisers. Poultry hatchlings 20 are generally shipped in shipping containers which are divided into four sections or quadrants through the use of removable dividers 22. Thus, the drinking tray illustrated in FIG. 1 is itself divided into four fluid containment regions 12 through the provision of two openings, namely slots 16 extending across the base 14 and bisecting each other at a right degree angle. When the shipping carton is being assembled for shipping of the hatchling, the drinking tray 10 is placed centrally in the carton, the dividers 22 placed together and inserted into the carton such that the dividers 22 lay in the slots 16 of the drinking tray 10. This is better illustrated in FIG. 2.

Each of the fluid containment regions 12 of the drinking tray 10 is provided with a fluid holding portion, specifically a drinking trough 24. The drinking trough 24 may be of any size and shape sufficient to provide for sufficient fluid to prevent dehydration of the animals in the shipping carton. In the case of poultry hatchlings, it has been found that 1 to 2 ml of fluid per hatchling is sufficient to prevent dehydration of the hatchling during a period of two to three days. In most commonly utilized shipping containers for poultry hatchlings, the container carries twelve hatchlings in each of the sections. Thus, the drinking trough 24 for use with poultry hatchlings should be of a size to contain at least 15 to 25 ml of fluid. To reduce the possibility of spills during shipment, the drinking trough 24 may be made slightly oversized. Thus, for the poultry hatchling, a trough capable of holding 40 to 50 ml of fluid is preferred.

To reduce the risk of potential damage to the feet of the animals being transported, the sides 18 of the fluid containment regions 12 are preferably generally perpendicular.

In the preferred embodiment illustrated, the drinking trough 24 is generally H-shaped having two arms 26 and 28 interconnected by a fluid channel 30, the arms being separated by dividers 32. It has been found that this shaping of the drinking trough 24 provides for sufficient capacity to contain 15 to 25 ml of fluid while at the same time reducing the possibility of the hatchling sitting in or on the drinking tray 10 to thereby foul the fluid contained in the drinking trough 24. Each of the fluid containment regions 12 of the drinking tray 10 are provided with a perimeter bead 34 which adds increased rigidity to the region 12 of the drinking tray 10 as well as providing for a barrier should some of the fluid splash out of the drinking trough 24.

Figure 2:
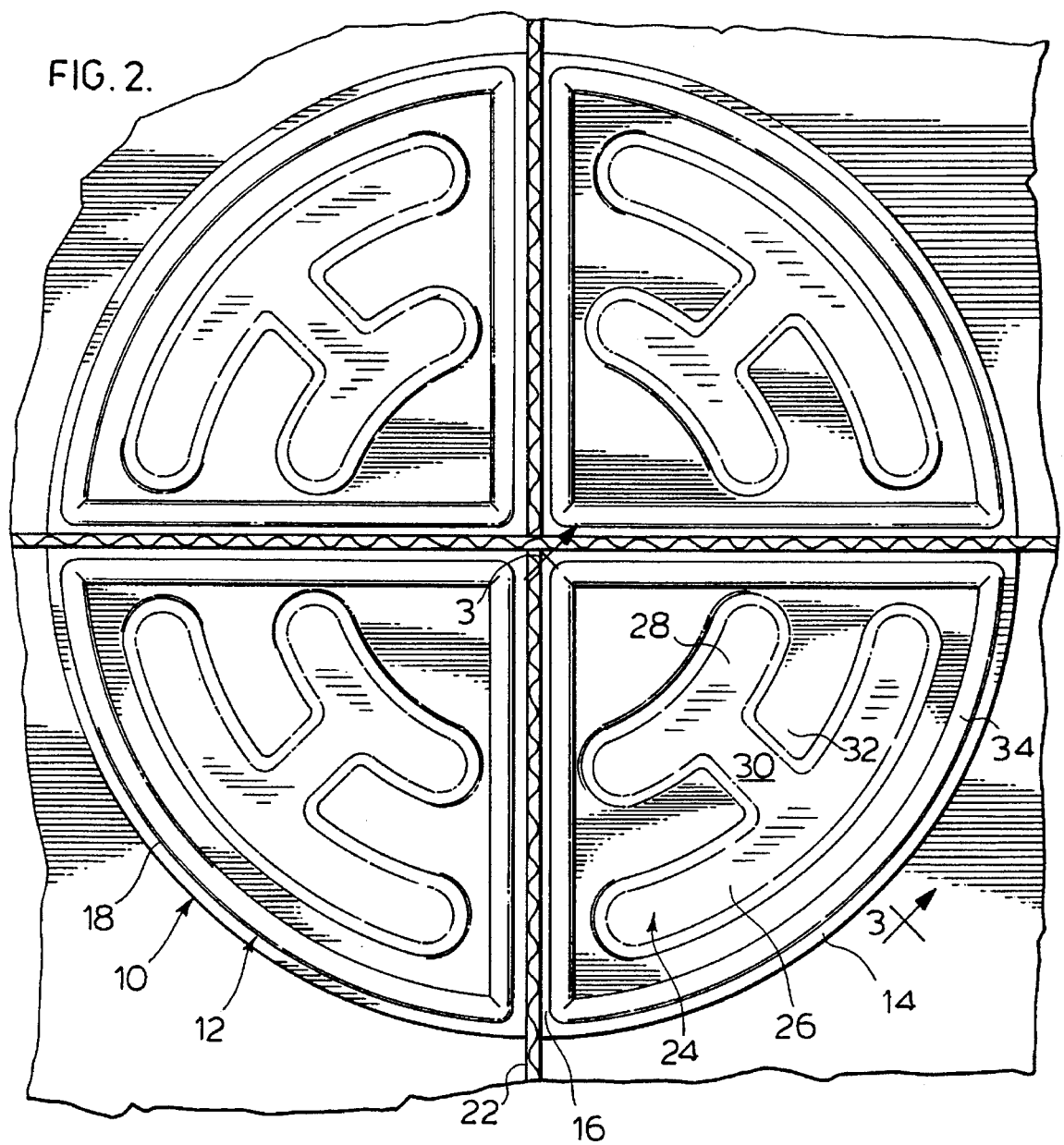
FIG. 2 is a top planar view of the drinking tray of FIG. 1.
Figure 3:
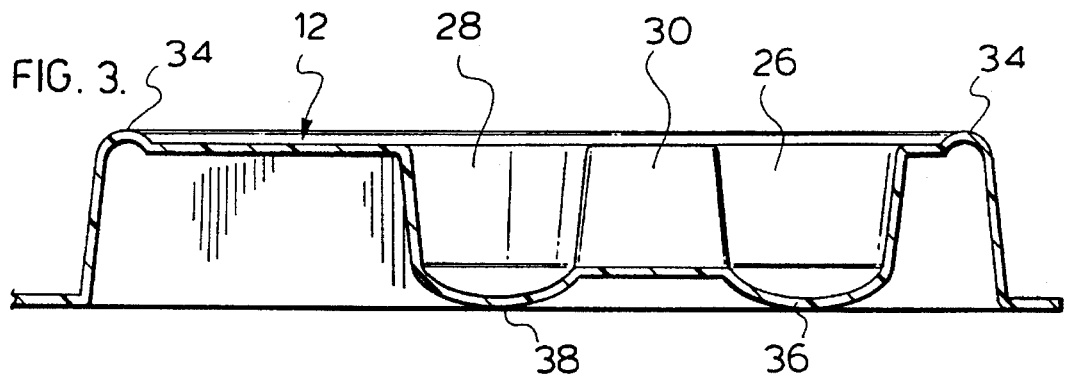
FIG. 3 is a cross-section of the drinking tray of FIG. 2 along lines 3—3.

FIG. 3 illustrates a cross-section through one region 12 of the drinking tray 10 of FIG. 2 along the line 3—3. As illustrated in this cross-section, both of the arms 26 and 28 are similar in cross-section having rounded bottoms 36 and 38 and interconnected by the fluid channel 30. If desired, the cross-section of the arms 26 and 28 could be varied to provide for a sloping bottom to maintain the maximum amount of fluid in the first arm 26 as the fluid level in the drinking trough decreases. Thus, the bottom of the drinking trough may slope downwardly from the second arm 28 which could then be considered to be a fluid reservoir through the fluid channel 30 and into the first arm 26 which could then be the actual drinking area. With the method of making the drinking tray 10 as described above, this is very easy to accomplish through the provision of the proper mold or die.

For economy and to reduce the use of prime materials, the drinking tray is preferably constructed of a recycled material, more preferably a recycled plastic material, most preferably recycled polyethylene. The drinking tray may be manufactured by any of the usual methods for the material selected. For plastic materials the tray is preferably manufactured by a molding or pressing process. One particularly preferred method of manufacturing the drinking trays is pressing a polyethylene sheet in a press containing a die or mold to impart the shape of the tray to the sheet.

The drinking tray of the present invention provides for a very simple, economical way of providing fluid to small animals during the transport. The tray is easy to manufacture and use. The tray is placed in the bottom of the shipping container and then the dividers to divide the container into sections are placed in the openings between the fluid containment regions such that each section of the shipping container is provided with a region of the drinking tray. In this way, the drinking tray is held securely in place by the dividers of the shipping carton and the drinking tray is thereby prevented from being moved around during the transport of the animal.

The drinking tray may be used to administer water or other fluids to the animals during shipment. Among other fluids which may be administered are aqueous based vaccines, nutrients, medicaments or other agents. Thus, in the case of poultry hatchlings, they may be administered aqueous based vaccines for diseases such as coccidiosis. Additionally, it is known that poultry mortality may be reduced by the administration of propionic acid or other triggering agents for gluconeogenesis. Such agents in an aqueous solution could be placed in the tray for ingestion by the animals during shipment.

While the drinking tray of the present invention is particularly suitable for use with divided shipping containers, it may also be used with the undivided cartons. Additionally, due to the design of the tray of the preferred embodiment it may be used with undivided shipping cartons, as well as shipping cartons divided into two sections by the use of one divider or shipping cartons divided into four sections by the use of two dividers. Thus, the drinking tray of the preferred embodiment provides for increased economy through flexibility of use.

Drinking trays are also used in many other situations involving small animals. For example, in the hatcheries, drinking trays may be used to administer vaccines or other agents such as medicaments, nutrients, etc. The drinking tray of the present invention may also be used in such situations.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In combination a shipping container for transport of small animals, the shipping container being divided into at least two sections by at least one removable divider, and a transport drinking tray, the drinking tray comprising a plurality of fluid containment regions mounted on a common base each of the regions being provided with a drinking trough, the fluid containment regions being separated by slots extending across the base, the slots receiving the removable dividers to provide one fluid containment region for each section of the shipping container and to stabilize all of the drinking troughs through the contact of the dividers and the common base.

2. A drinking tray as claimed in claim 1 wherein the tray is generally circular.

3. A drinking tray as claimed in claim 2 wherein the fluid containment regions are generally pie-shaped.

4. A drinking tray as claimed in claim 3 wherein the tray has four fluid containment regions separated by bisecting elongate openings.

5. A drinking tray as claimed in claim 4 wherein the drinking trough is sized to accept sufficient fluid to prevent dehydration of the animals.

\* \* \* \* \*